United States Patent
Iwata et al.

(10) Patent No.: US 6,890,594 B2
(45) Date of Patent: May 10, 2005

(54) METHOD OF PROCESSING INNER SURFACE OF BEARING

(75) Inventors: Hideki Iwata, Inuyama (JP); Takahiro Niwa, Inuyama (JP); Takeshi Shindo, Inuyama (JP); Kotaro Kashiyama, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 10/691,521

(22) Filed: Oct. 24, 2003

(65) Prior Publication Data

US 2004/0081755 A1 Apr. 29, 2004

(30) Foreign Application Priority Data

Oct. 25, 2002 (JP) ........................................ 2002-310947

(51) Int. Cl.[7] .............................. B05D 7/22; B05D 3/00
(52) U.S. Cl. ........................ 427/239; 427/355; 427/384
(58) Field of Search ................................ 427/230, 239, 427/355, 359, 372.2, 384, 444

(56) References Cited

U.S. PATENT DOCUMENTS

| | | | | | |
|---|---|---|---|---|---|
| 3,574,429 A | * | 4/1971 | Reising | ...................... | 384/300 |
| 3,705,450 A | * | 12/1972 | Morisaki | ..................... | 428/545 |
| 3,958,595 A | * | 5/1976 | Al et al. | ...................... | 137/375 |
| 4,000,982 A | * | 1/1977 | Ueda | .......................... | 428/545 |
| 4,575,429 A | * | 3/1986 | Jacobson | ................... | 428/550 |

FOREIGN PATENT DOCUMENTS

| | | | |
|---|---|---|---|
| GB | 988258 | 4/1965 | |
| GB | 2 174 460 A | * 11/1986 | ........... F16C/33/10 |
| JP | 2001-311429 | 11/2001 | |
| JP | 2001-311429 A | 11/2001 | |

OTHER PUBLICATIONS

Definition of "jig" from Merriam–Webster's Collegiate Dicitonary, 10th Edition, 201 1999 by Merriam–Webster, Inc., p. 629.*

* cited by examiner

*Primary Examiner*—Bret Chen
*Assistant Examiner*—William Phillip Fletcher, III
(74) *Attorney, Agent, or Firm*—Browdy and Neimark, P.L.L.C.

(57) ABSTRACT

The invention provides a method of processing an inner surface of a bearing having a cylindrical shape which bearing includes a resin layer composed mainly of a synthetic resin as the inner surface, the method improving roughness of the inner surface and dimensional accuracy of an inner diameter of the bearing without cutting the inner surface. According to the method, the bearing is press-fitted into a jig and then the jig is mounted on a chuck. Next, a mandrel having a cylindrical bar shape is inserted into an inner diameter portion of the bearing and then the mandrel is heated by a heater up to 250° C., for example. The mandrel is expanded due to thermal expansion by the heating so that the inner surface, i.e., a surface of the resin layer is pressed by a press face of a peripheral surface of the mandrel.

4 Claims, 1 Drawing Sheet

METHOD OF PROCESSING INNER SURFACE OF BEARING

BACKGROUND OF THE INVENTION

1. Field of the Invention

The present invention relates to a method of processing an inner surface of a bearing having a cylindrical shape which bearing includes a resin layer composed mainly of synthetic resin on the innermost side thereof.

2. Description of the Prior Art

Conventionally, there has been a cylindrical shaped bearing including a resin layer provided on an inner surface thereof, which bearing is fabricated by a method including the steps of providing a porous sintered body on a backing metal of a flat plate shape for example, providing the resin layer on the porous sintered body by impregnating and coating the porous sintered body with synthetic resin, for example, with thermosetting resin so that a flat plate material is obtained, cutting the flat plate material to have a predetermined dimension, and subjecting the cut flat plate material to bending working (or winding working) such that the cylindrical shaped bearing has the resin layer on the inner surface thereof.

When producing a bearing having such a configuration, there has been the case that a surface of the resin layer becomes rough, or dimensional accuracy of an inner diameter of the bearing deteriorates, due to a difference between a contraction coefficient of the resin forming the resin layer and that of the porous sintered body and the like. Also, when performing the bending working such that the resin layer is located on the inner side, the thickness of the resin layer is increased, which results in an uneven thickness of the resin layer. In order to solve these problems, there has been the case that it is necessary to process the inner surface of the bearing.

In the case of a bearing used in a compressor for an air conditioner for example, high accuracy is required for an inner diameter of the bearing to enhance the compression capacity. In such a case, by applying machine work such as cutting or polishing, the roughness of the inner surface of the bearing is improved, and the accuracy of the inner diameter of the bearing is secured.

On the other hand, in the case of a bearing configured such that the above-mentioned resin layer includes fibers, there is known a method of inserting a bar shaped mandrel into an inner diameter portion of the bearing after cutting the resin layer of the inner surface of the bearing, so as to press scuffing of the fibers generated by the cutting with a peripheral surface of the mandrel (see JP-A-2001-311429, especially claims 1 and 3, paragraphs [0004] and [0006], and FIGS. 1 and 4 therein). JP-A-2001-311429 also discloses a method of inserting a heated mandrel into the inner diameter portion of the bearing after cutting the resin layer of the inner surface of the bearing.

BRIEF SUMMARY OF THE INVENTION

However, since the above conventional methods require the cutting of an inner surface of a bearing, cutting powder or polishing powder generated during the cutting process is often disposed of as industrial wastes, which is not preferable in view of the environmental protection. Further, when using a blade such as a cutting tool in the cutting process, the blade contacts a Cu—Sn alloy used in the porous sintered body, or a hard particle contained in the resin layer, thereby the blade may sustain damage such as chipping and the like. This decreases the working life of the blade, or requires the maintenance of the blade.

The present invention has been made in view of the foregoing circumstances, and the object thereof is to provide a method of processing an inner surface of a bearing which has a cylindrical shape and includes a resin layer made primarily of synthetic resin on the innermost side thereof, which method can improve roughness of the inner surface and dimensional accuracy of an inner diameter of the bearing without cutting the inner surface of the bearing.

In order to achieve the above object, according to a first aspect of the invention, there is provided a method of processing an inner surface of a bearing having a cylindrical shape, which bearing includes a resin layer made primarily of synthetic resin on the innermost side thereof, the method including the steps of holding the bearing in a jig, inserting a mandrel into a bore of the bearing, heating the mandrel, and pressing a peripheral surface of the mandrel against the resin layer to finish the inner surface of the bearing without cutting there.

According to the above-mentioned method, the resin layer of the inner surface of the bearing is pressed by a pressing face, namely by the peripheral surface of the mandrel expanded by the heating. At this time, the bearing is held in the jig to constrain its deformation to an outside. Consequently, because the resin layer of the inner surface of the bearing is thermally deformed in an uniform state, it is possible to improve the roughness of the inner surface of the bearing and enhance the dimensional accuracy of the bearing.

Further, since this method does not adopt the cutting to the inner surface of the bearing, there is not generated a cutting powder and an abrasion powder so that wastes can be reduced accordingly. Furthermore, since a blade for the cutting is not used, maintenance thereof is not also unnecessary.

According to a second aspect of the invention, in the method according to the first aspect, the mandrel may be heated within the bore of the bearing so that the peripheral surface of the mandrel is pressed against the resin layer due to thermal expansion of the mandrel.

According to a third aspect of the invention, in the method according to the first aspect, the peripheral surface of the mandrel may be tapered, and the mandrel heated to a predetermined temperature and expanded thereby may be inserted into the bore of the bearing so as to press the peripheral surface thereof against the resin layer.

According to a fourth aspect of the invention, in the method according to the first aspect, the peripheral surface of the mandrel may be tapered, and the mandrel heated and expanded thereby may be inserted into the bore of the bearing so as to press the peripheral surface thereof against the resin layer, wherein the mandrel may be further heated within the bore of the bearing so that the peripheral surface of the mandrel is pressed against the resin layer due to thermal expansion of the mandrel.

According to a fifth aspect of the invention, the synthetic resin may be polytetrafluoroethylene (PTFE).

According to a sixth aspect of the invention, the synthetic resin may also be thermosetting resin. In addition to the advantages effected by the invention according to the first aspect, the sixth aspect also provides an advantage that the curing reaction (cross-linking reaction) of thermosetting resin constituting the resin layer is enhanced in accordance with supply of heat from the mandrel, so that the surface (sliding surface) of the resin layer is further strengthened, thereby properties of the bearing such as wear resistance and the like are improved. In the case that the synthetic resin of the invention according to the fourth aspect is the thermosetting resin, the mandrel may be heated up to about 100° C. and then inserted into the bore of the bearing while contacting the bore. Thereafter, the mandrel may be further heated up to 250° C. to press the bore due to the thermal expansion thereof.

According to a seventh aspect of the invention, the resin layer may be formed by impregnating and coating a porous sintered layer provided on a backing metal, primarily with the synthetic resin.

According to an eighth aspect of the invention, the roughness of the peripheral surface of the mandrel is preferably Ry 1.0 μm or less. The method according to this can improve the roughness of the surface of the resin layer more favorably, and make the mold release property in pulling the mandrel from the bearing satisfactory.

According to a ninth aspect of the invention, the roughness of the peripheral surface of the mandrel is preferably Ry 0.5 μm or less. The method according to this can further improve the roughness of the surface of the resin layer more favorably, and make the mold release property in pulling the mandrel from the bearing more satisfactory.

Other objects, features and advantages of the invention will become apparent from the following description of the embodiments of the invention taken in conjunction with the accompanying drawing.

DETAILED DESCRIPTION OF THE INVENTION

Figure 1:
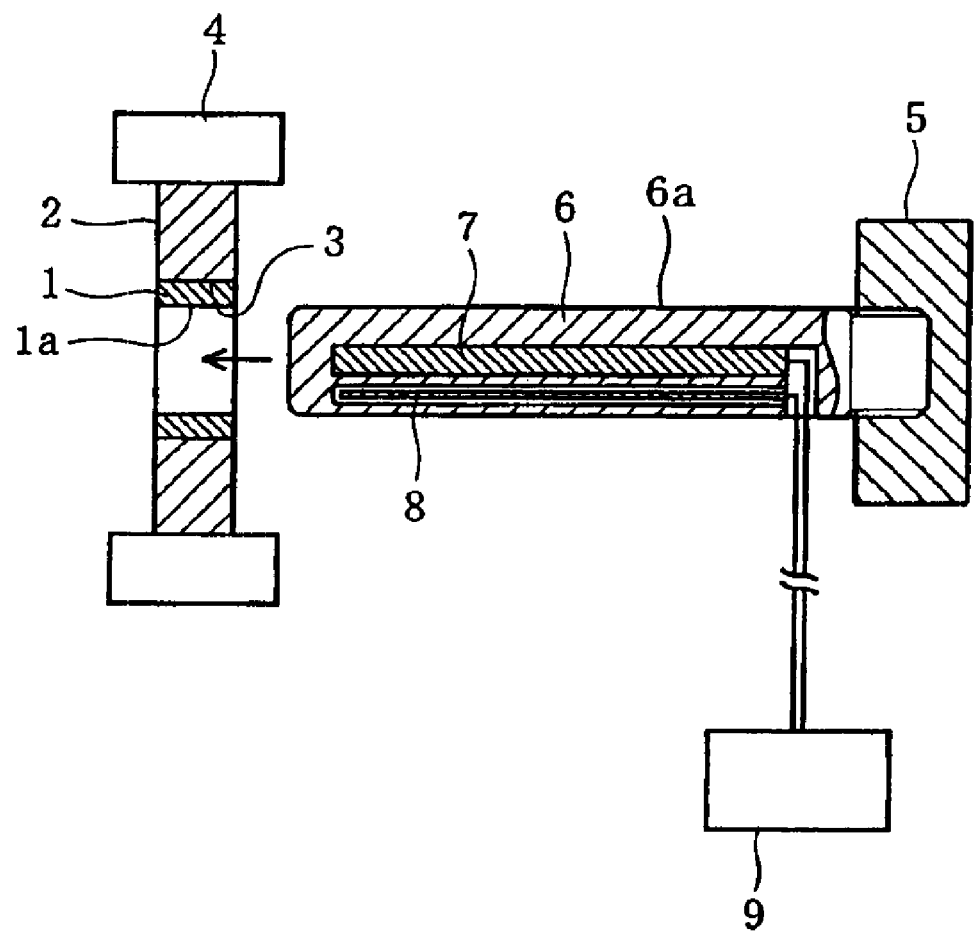
FIG. 1 illustrates an embodiment of the invention and is a vertical front sectional view in a step of processing an inner surface of a bearing.

Bearings used for examples are produced as follows.

Firstly, a flat plate of a thickness of 1.2 mm on which surface copper plating is applied is used as a steel plate constituting a backing metal layer of a bearing. On the steel plate (or on the copper plating), copper alloy powder is spread so as to have a thickness of 0.3 mm, and then the copper alloy powder is sintered by heating it up to 750 to 900° C. in a reducing atmosphere, thereby a porous sintered body is obtained on the backing metal layer (or on the copper plating).

Then, the porous sintered body is impregnated and coated with a synthetic resin to form a resin layer. Here, following three kinds of resins are employed as the synthetic resin, and the resin layer is formed as follows.

1. PEEK (polyether etherketone) (thermoplastic resin)

The PEEK resin of a pellet shape is formed into a resin sheet by a sheet extruder. While heating and maintaining the porous sintered layer on the above-described backing metal layer at 350 to 600° C., the resin sheet is superimposed on the porous sintered layer and then, those are subjected to pressure bonding between rolls to obtain a flat plate material with the porous sintered layer impregnated and coated with the PEEK resin 2. PTFE (thermoplastic resin)

Firstly, a PTFE mixture is prepared by uniformly blending Pb powder into PTFE. Then, the porous sintered layer on the above-described backing metal layer is impregnated and coated with the mixture. Thereafter, those are calcined at a temperature from 350 to 400° C. and then subjected to rolling to obtain a flat plate material having a uniform thickness as a whole.

3. PF (polyphenol) (thermosetting resin)

After impregnating and coating the porous sintered layer on the above-mentioned backing metal layer with a varnish prepared by dissolving PF resin of thermosetting resin into an organic solvent together with PTFE powder (PF:PTFE= 4:1, by volume ratio), those are cured at a temperature of 150 to 250° C., to obtain a flat plate material impregnated and coated with the PF resin.

Then, each flat plate material is cut to a predetermined dimension and subjected to bending (winding) to produce a cylindrical bearing. Each bearing had an outer diameter of 23 mm, an inner diameter of 20 mm, and a width (length in an axial direction) of 15 mm.

An inner surface of each of the three kinds of bearings as produced in the above is processed in such a way as shown in FIG. 1. Firstly, the cylindrical bearing 1 is press-fitted into a mounting part 3 of a jig 2, and then the jig 2 is mounted in a chuck 4. Then, a mandrel 6 having a cylindrical bar shape with one end thereof held by a holder 5 is inserted into an inner diameter portion of the bearing 1, and thereafter the mandrel 6 is heated by a heater 7 provided therein as a heating means at 250° C., for example. A peripheral surface of the mandrel 6 is set as a press face 6a. A thermocouple 8 is provided inside the mandrel 6 for detecting temperature thereof, so that the temperature of the mandrel 6 is controlled by a controller 9 while detecting the temperature of the mandrel 6 by the thermocouple 8.

In accordance with this heating, the mandrel 6 is expanded due to thermal expansion, so that the inner surface 1a of the bearing 1, i.e., the surface of the resin layer becomes uniformly pressed from an inner diameter side toward an outer diameter side by the press face 6a of the peripheral surface of the mandrel 6. At this time, the bearing 1 is held in the jig 2 so that its outward deformation is constrained. After maintaining the mandrel 6 at 250° C. for 5 minutes, it is pulled out from the bearing 1.

In this case, two kinds of mandrels 6 having different roughness on the press face 6a of the peripheral surface are prepared, and each of the above-mentioned three kinds of resin layers is subjected to an inner surface treatment using the two kinds of mandrels 6, respectively. Table 1 shows conditions concerning the mandrels used for Examples 1–3 and Examples 4–6, and treating conditions. Table 2 shows test results for Examples 1–6.

TABLE 1

| | Mandrel | | | | |
| --- | --- | --- | --- | --- | --- |
| | Diameter before heating (mm) | Diameter after heating (mm) | Press face roughness (μm Ry) | Preset temperature (° C.) | Processing time (min) |
| Examples 1–3 | 20.008 | 20.062 | 0.8 | 250 | 5 |
| Examples 4–6 | 20.008 | 20.062 | 0.3 | 250 | 5 |

TABLE 2

| | Resin type of resin layer | Inner diameter of bearing (mm) | | Roughness (μm) | | |
|---|---|---|---|---|---|---|
| | | Before processing | After processing | Before processing (Ry) | After processing (Ry) | Difference |
| Example 1 | PEEK | 20.000 +/- 0.050 | 20.060 +/- 0.040 | 7.71 | 2.17 | 5.54 |
| Example 2 | PTFE | 20.040 +/- 0.040 | 20.060 +/- 0.030 | 8.27 | 3.80 | 4.47 |
| Example 3 | PF | 20.020 +/- 0.060 | 20.060 +/- 0.040 | 17.80 | 10.73 | 6.07 |
| Example 4 | PEEK | 20.000 +/- 0.050 | 20.060 +/- 0.040 | 8.22 | 2.35 | 5.87 |
| Example 5 | PTFE | 20.040 +/- 0.040 | 20.060 +/- 0.030 | 8.55 | 3.15 | 5.40 |
| Example 6 | PF | 20.020 +/- 0.060 | 20.060 +/- 0.040 | 20.89 | 11.03 | 9.86 |

As shown in Table 1, a mandrel having a press face roughness (Ry) of 0.8 μm is used for Examples 1–3, and a mandrel having a press face roughness (Ry) of 0.3 μm is used for Examples 4–6. Here, the roughness Ry represents the difference between the height of the highest crest and the depth of the lowest trough.

The followings can be understood from Table 2. Firstly, in comparing the roughness before the processing and the roughness after the processing for each of Examples 1–6, the roughness after the processing is smaller in all Examples, and accordingly it can be understood that the roughness of the inner surface of the bearing is improved by the processing by the mandrels. Secondly, in comparing the bearing inner diameter before the processing and the bearing inner diameter after the processing for each of Examples 1–6, the numbers stated after "+/-" (which mean a range of variations) for the bearing inner diameter after the processing are smaller, and accordingly it can be understood that the accuracy of the inner diameter of the bearing is improved after the processing.

Further, in comparing Example 1 and Example 4, the difference between the roughness before the processing and the roughness after the processing in Example 4 is greater than that in Example 1, and accordingly it can be understood that the roughness in Example 4 (in which a mandrel having a press face roughness of 0.3 μm is used) is improved in comparison with that in Example 1 (in which a mandrel having a press face roughness of 0.8 μm is used). This would be because the roughness of the press face of the mandrel is smaller in Example 4. Similarly, in comparing Example 2 and Example 5, the difference between the roughness before the processing and the roughness after the processing in Example 5 is greater than that in Example 2, and accordingly it can be understood that the roughness in Example 5 (in which the mandrel having a press face roughness of 0.3 μm is used) is improved in comparison with that in Example 2 (in which the mandrel having a press face roughness of 0.8 μm is used). Yet similarly, in comparing Example 3 and Example 6, the difference between the roughness before the processing and the roughness after the processing in Example 6 is greater than that in Example 3, and accordingly it can be understood that the roughness in Example 6 (in which the mandrel having a press face roughness of 0.3 μm is used) is improved in comparison with that in Example 3 (in which the mandrel having a press face roughness of 0.8 μm is used).

In this connection, as all of the bearings of Examples 1–6 have favorable surface roughness, friction and wear resistance properties thereof are satisfactory. Especially, distinguished effects are observed in initial conformability.

In the case that a bearing 1 employing PF, which is thermosetting resin, as the resin layer for example is subjected to mandrel processing using a mandrel having a press face roughness of 2 μm, a part of the surface of the resin layer surface may be peeled off, in other words, nipping out may be generated when pulling the mandrel 6 out of the bearing. In considering such a point, a press face roughness of the mandrel is preferably 1 μm or less, more preferably 0.8 μm or less, still preferably 0.5 μm or less, and still yet preferably 0.3 μm or less.

The present invention is not limited to the above-mentioned embodiments but can be modified or expanded as described below.

With respect to timing of inserting a mandrel 6 into an inner diameter portion of a bearing 1 and heating the mandrel 6, although the above-mentioned Examples show an example where the mandrel 6 is heated after having been inserted into the bearing, the timing is not limited to that in the example and accordingly, the mandrel 6 may be heated while inserting it into the inner diameter portion, or may be inserted after having been previously heated.

Regarding the bearing, it is not limited to one which has a cylindrical shape by a single piece, but can be one which form a cylindrical shape by two (half bearings).

Further, it may be possible to set a plurality of bearings 1 to be subjected to the inner surface processing in an axial direction to process the plurality of bearings simultaneously.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of processing and finishing an inner surface of a bearing having a cylindrical shape, without cutting, which bearing comprises a backing metal, an impregnated and coated layer formed by impregnating and coating a porous sintered layer of a Cu-alloy powder provided on the backing metal with a polytetrafluoroethylene composition, and a resin layer composition formed on the impregnated and coated layer and consisting essentially of the polytetrafluoroethylene, the resin layer being positioned on the innermost side of the bearing, the method comprising:

holding the bearing in a jig to contain outward deformation of said bearing;

heating a tapered mandrel having a peripheral surface to a predetermined temperature so as to expand the mandrel by thermal expansion thereof, said peripheral surface having a roughness of Ry 1.0 μm or less; and inserting the heated mandrel into a bore of the bearing so as to press the peripheral surface of the mandrel against the resin layer of the bearing, whereby the inner surface of the bearing is finished without cutting the resin layer.

2. A method of processing an inner surface of a bearing according to claim 1, wherein the roughness of the peripheral surface of the mandrel is Ry 0.5 μm or less.

3. A method of processing and finishing an inner surface of a bearing having a cylindrical shape, without cutting, which bearing comprises a backing metal, an impregnated and coated layer formed by impregnating and coating a porous sintered layer of a Cu-alloy powder provided on the backing metal with a polytetrafluoroethylene composition, and a resin layer composition formed on the impregnated and coated layer and consisting essentially of the polytetrafluoroethylene, the resin layer being positioned on the innermost side of the bearing, the method comprising:

holding the bearing in a jig to constrain outward deformation of said bearing;

heating a tapered mandrel having a peripheral surface to a predetermined temperature so as to expand the mandrel by thermal expansion thereof, said peripheral surface having a roughness of Ry 1.0 μm or less;

inserting the heated mandrel into a bore of the bearing so as to press the peripheral surface of the mandrel against the resin layer of the bearing; and further heating the inserted mandrel within the bore of the bearing so as to press the peripheral surface of the mandrel against the resin layer of the bearing by thermal expansion of the mandrel, whereby the inner surface of the bearing is finished without cutting the resin layer.

4. A method of processing an inner surface of a bearing according to claim 3, wherein the roughness of the peripheral surface of the mandrel is Ry 0.5 μm or less.

* * * * *